United States Patent
Mazur et al.

(10) Patent No.: US 7,971,923 B2
(45) Date of Patent: Jul. 5, 2011

(54) DOOR TRIM PANEL ASSEMBLY AND METHOD

(75) Inventors: Lorin A. Mazur, Shelby, MI (US); Sara M. Repen, Farmington, MI (US); James Axiotis, Auburn Hills, MI (US); David Helmer, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 12/397,538

(22) Filed: Mar. 4, 2009

(65) Prior Publication Data

US 2010/0225142 A1 Sep. 9, 2010

(51) Int. Cl.
*B60J 5/00* (2006.01)
(52) U.S. Cl. .................................... 296/146.7
(58) Field of Classification Search .............. 49/502; 296/39.1, 146.5, 146.7, 152, 153
See application file for complete search history.

(56) References Cited

U.S. PATENT DOCUMENTS

| | | | | |
|---|---|---|---|---|
| 4,746,162 A | * | 5/1988 | Maness | 296/152 |
| 4,923,542 A | * | 5/1990 | Janicki et al. | 156/92 |
| 5,040,334 A | * | 8/1991 | Dossin et al. | 49/502 |
| 5,531,499 A | * | 7/1996 | Vecchio et al. | 296/146.7 |
| 5,647,631 A | * | 7/1997 | Lee | 296/146.6 |
| 6,196,607 B1 | * | 3/2001 | Gulisano | 296/39.1 |
| 6,381,906 B1 | * | 5/2002 | Pacella et al. | 49/502 |
| 6,966,601 B2 | * | 11/2005 | Matsumoto et al. | 296/146.2 |
| 7,198,315 B2 | * | 4/2007 | Cass et al. | 296/29 |
| 7,784,851 B2 | * | 8/2010 | Filipczak et al. | 296/146.1 |
| 7,874,104 B2 | * | 1/2011 | Kimoto et al. | 49/502 |
| 2002/0027376 A1 | * | 3/2002 | Marcovecchio et al. | 296/146.7 |
| 2006/0091696 A1 | * | 5/2006 | Kohara et al. | 296/152 |
| 2010/0019534 A1 | * | 1/2010 | Lipski | 296/146.7 |

FOREIGN PATENT DOCUMENTS

| | | | |
|---|---|---|---|
| DE | 3510018 A1 | * | 1/1986 |
| EP | 483895 A1 | * | 5/1992 |
| JP | 58174039 A | * | 10/1983 |
| JP | 60222319 A | * | 11/1985 |
| JP | 62094435 A | * | 4/1987 |
| JP | 01247214 A | * | 10/1989 |

* cited by examiner

*Primary Examiner* — Glenn Dayoan
*Assistant Examiner* — Paul A Chenevert
(74) *Attorney, Agent, or Firm* — Quinn Law Group, PLLC

(57) ABSTRACT

A vehicle door assembly is provided that includes a retainer that secures to a door body panel, specifically, to the door inner panel, and is configured such that a door trim component or components may be secured to the retainer, rather than directly to the door trim panel. Door trim components of lightweight materials may be used, with the retainer providing the structural integrity required for securement to the door inner panel. Because it is not a visible component in the assembled door, the same retainer design may be used for doors of different models in a given vehicle platform, with different door trim components of different materials or styles consistent with the different models secured to identical retainers.

16 Claims, 8 Drawing Sheets

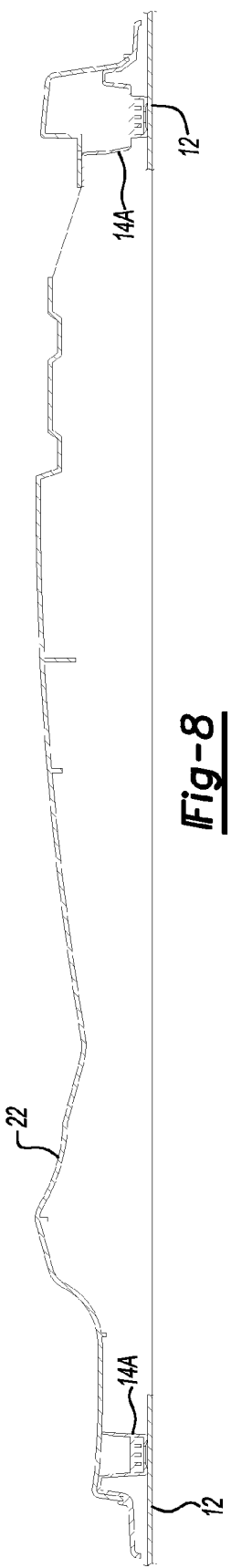
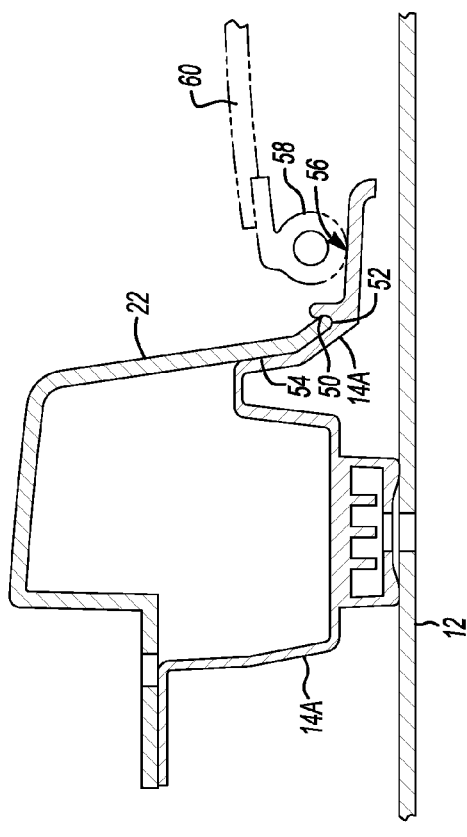
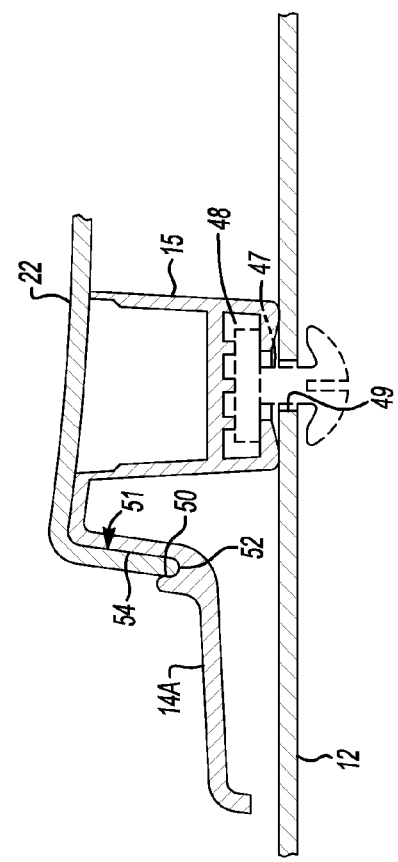
Fig-8
Fig-9
Fig-10

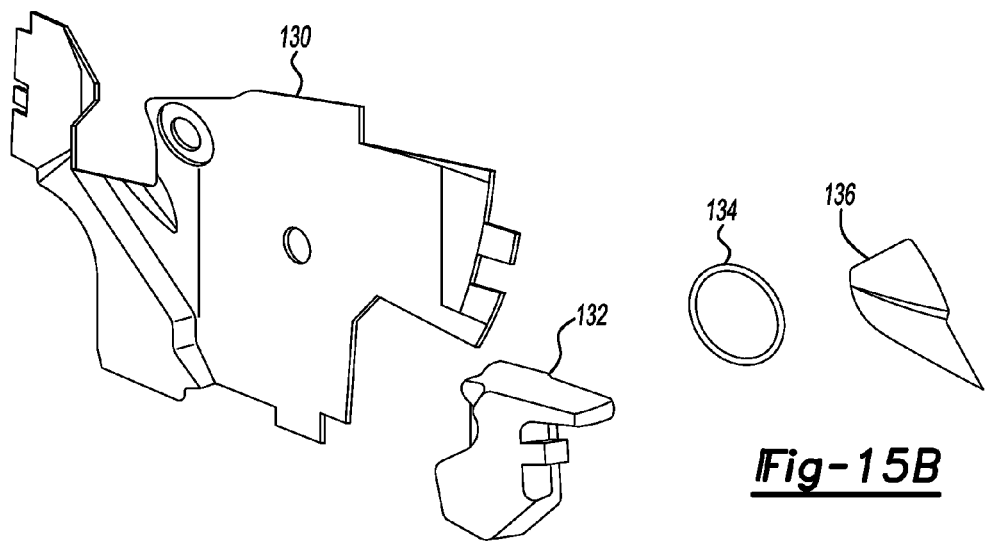
*Fig-15B*
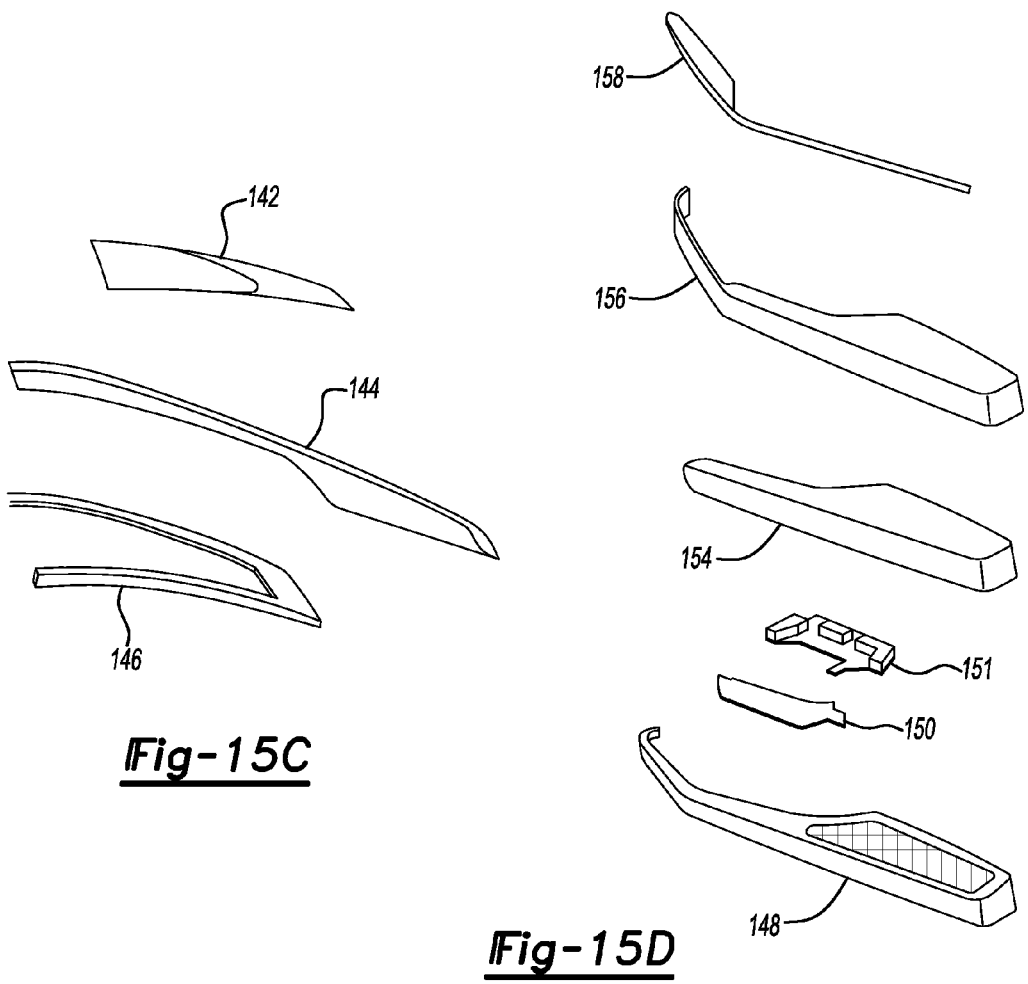
*Fig-15C*
*Fig-15D*

DOOR TRIM PANEL ASSEMBLY AND METHOD

TECHNICAL FIELD

The invention relates to a door trim panel assembly for a vehicle door and a method of assembling same.

BACKGROUND OF THE INVENTION

Vehicle doors are complex assemblies that typically include a door outer panel visible from outside of the vehicle, a door inner panel, and a plurality of door trim panel components secured to the door inner panel inward of the door inner panel (i.e., inboard of, on the side of the door inner panel facing the passenger compartment). The door trim panel components therefore must be structurally able to securely attach to the door inner panel, while also presenting to the customer as an aesthetically pleasing surface. Numerous validation studies are necessary to ensure that each of the components of the vehicle door assembly interfit with one another and meet durability standards.

SUMMARY OF THE INVENTION

A vehicle door assembly that satisfies desired aesthetics while minimizing engineering validity tests is desired. Fuel economy concerns also drive the need for a door assembly that is lightweight, while providing sufficient structural integrity. These competing goals are met by providing a retainer that secures to the door panel, specifically, to the door inner panel, and is configured such that door trim component or components may be secured to the retainer, rather than directly to the door trim panel. Because it is not a visible component in the assembled door when the door is closed, the same retainer design may be used for doors of different models in a given vehicle platform, with different door trim components of different materials or styles consistent with the different models secured to identical retainers.

Because only the retainer is directly secured to the door panel, the retainer will require significant structural strength, but lighter weight materials may be used for the door trim component(s), thus providing fuel economy advantages. For example, the retainer may be a filled polypropylene, while the trim component(s) may be a natural fiber. Natural fibers are typically difficult to secure to sheet metal, and may not provide a consistent sealing interface. However, the retainer of filled polypropylene is able to fulfill these functions.

Because the retainer and door panel may be common components across multiple vehicle models of a given platform, the costs associated with validity testing of the retainer and its interface with the door panel is a shared cost spread across the multiple vehicle models, and is lower than the cost of testing a different retention apparatus for each separate model.

Accordingly, a method of assembling a vehicle door includes mounting a first door trim component of a first door of a first vehicle type to a first retainer configured to surround an outer periphery of the first door trim component by inserting the periphery into a first channel formed by the retainer. The method further includes mounting a second door trim component of a second door of a second vehicle type to a second retainer configured to surround an outer periphery of the second door trim component by inserting the periphery of the second door trim component into a second channel formed by the second retainer. The first and second retainers are substantially identical, but the first and the second door trim panels are of different materials. The retainer may be injection molded while the door trim component may be compression molded. Furthermore, the door trim component may be formed by layering a natural fiber substrate layer with a foam layer and an outer skin layer, a "cut-and-sew" layer, or the like. A negative or positive vacuum formed outer skin layer, a polypropylene-based foam layer, and a natural fiber substrate layer may be secured to one another and to the retainer by compression molding, with heat of the natural fiber substrate layer acting to melt the adjacent layers and bond the layers to one another.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a schematic cross-sectional view of the door assembly of FIG. 7 taken at the lines 8-8;

FIG. 9 is an enlarged schematic cross-sectional view of an end portion of FIG. 8;

FIG. 10 is an enlarged schematic cross-sectional view of an opposing end portion of FIG. 8;

FIG. 15B is a schematic perspective illustration in exploded view of door trim components for use with the trim panel assembly of FIG. 15A;

FIG. 15C is a schematic perspective illustration in exploded view of trim plates for use with the trim components of FIG. 15B;

FIG. 15D is a schematic perspective illustration in exploded view of an armrest assembly for use with the trim panel assembly of FIG. 15A;

DESCRIPTION OF THE PREFERRED EMBODIMENTS

Figure 1:
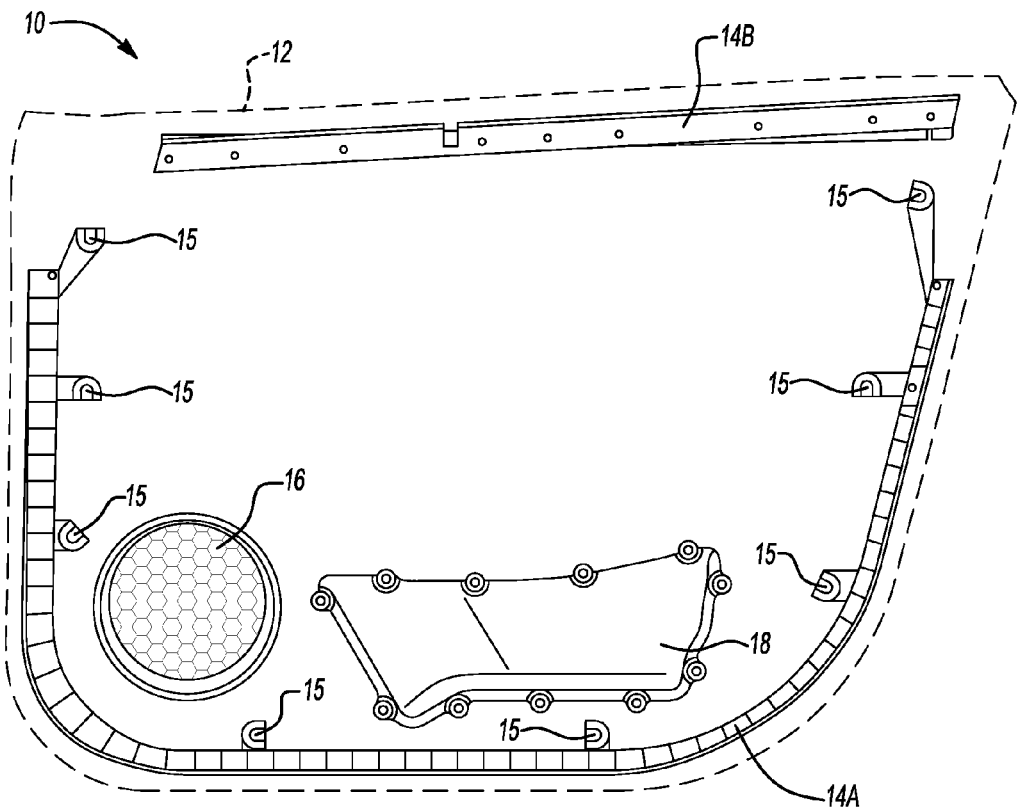
FIG. 1 is a schematic side illustration of a door assembly that includes a multi-piece retainer and additional structural components.

Referring to the drawings, wherein like reference numbers refer to like components throughout the several views, FIG. 1 shows a door assembly 10 that includes a door inner panel 12, shown only in phantom, and a multi-piece retainer including a lower retainer 14A and an upper retainer 14B. The lower retainer 14A includes integral fastener support portions 15. A speaker cover 16 is illustrated as well as a trim support 18. The retainers 14A, 14B, the speaker cover 16, the trim support 18 may all be a filled polypropylene material, such as a glass or talc-filled polypropylene or a thermoplastic olefin polypropylene-based compound. Such materials exhibit sufficient strength to be secured to a sheet metal component, such as door trim panel 12 and provide support to trim components, as described below. Additionally, such materials lend themselves to injection molding.

Figure 2:
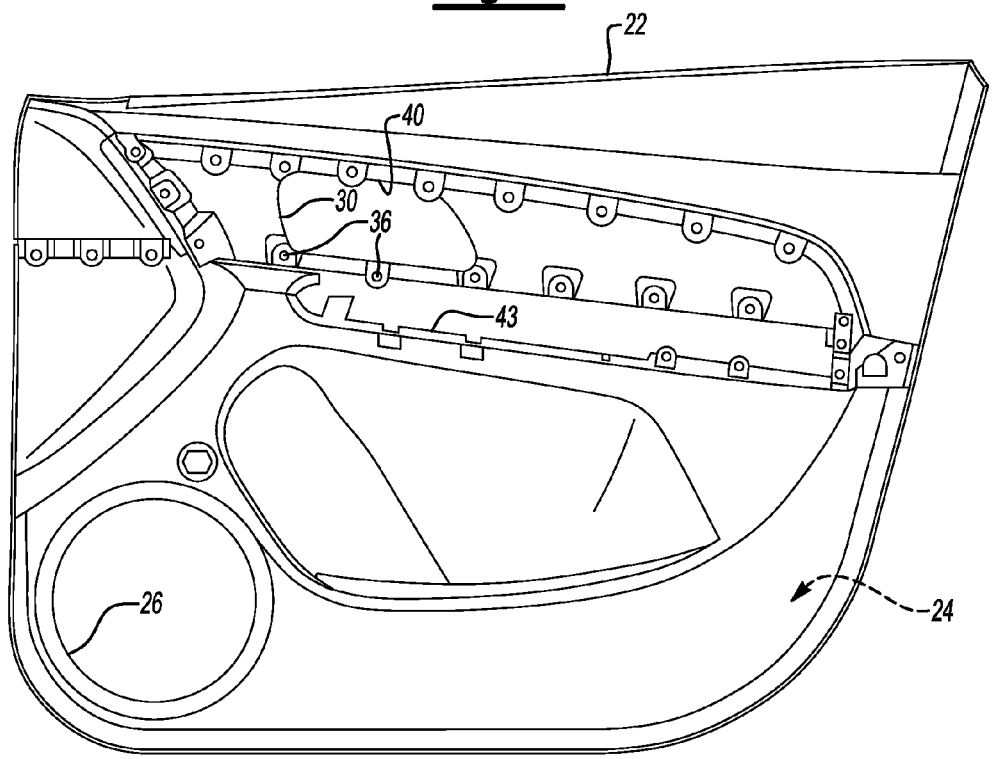
FIG. 2 is a schematic side illustration of a door trim panel.

Referring to FIG. 2, a door trim component in the form of a one-piece door trim panel 22 is illustrated. The door trim panel 22 may be a multi-layer component, including a relatively low mass substrate or base layer formed from natural fiber, a foam layer on the base layer, and a decorative skin or cut-and-sew layer on the foam layer and forming the viewing surface 24 (into the page) of the trim panel 22. Such multiple layers are illustrated with respect to the door assembly of FIG. 16. As used herein, a "cut-and-sew" layer is a layer of multiple pieces sewn together that shows the sewn seams. Referring to FIG. 1, the speaker grille 16 mounts in an opening 26 formed in the door trim panel 22 of FIG. 2. Additional decorative material, such as decorative strips (not shown), may be mounted to the door trim panel 22 as well.

Figure 3:
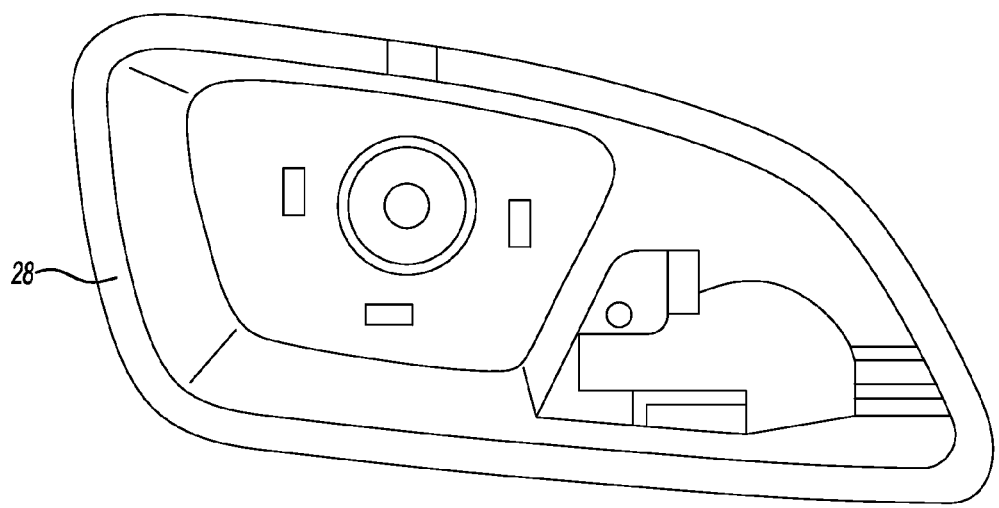
FIG. 3 is a schematic side illustration of a portion of a door handle.
Figure 4:
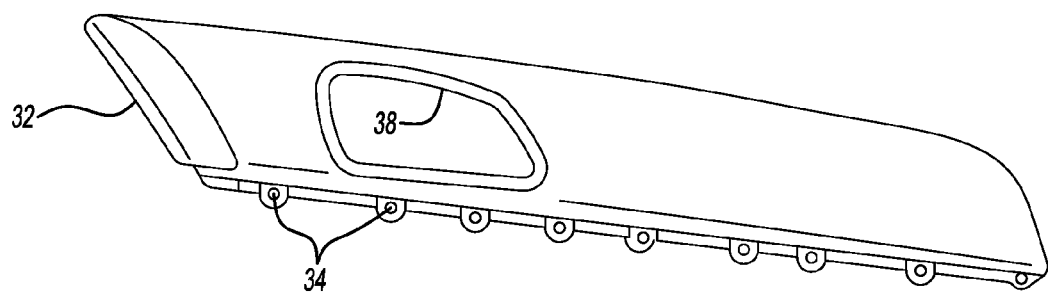
FIG. 4 is a schematic side illustration of a portion of an armrest assembly.
Figure 5:
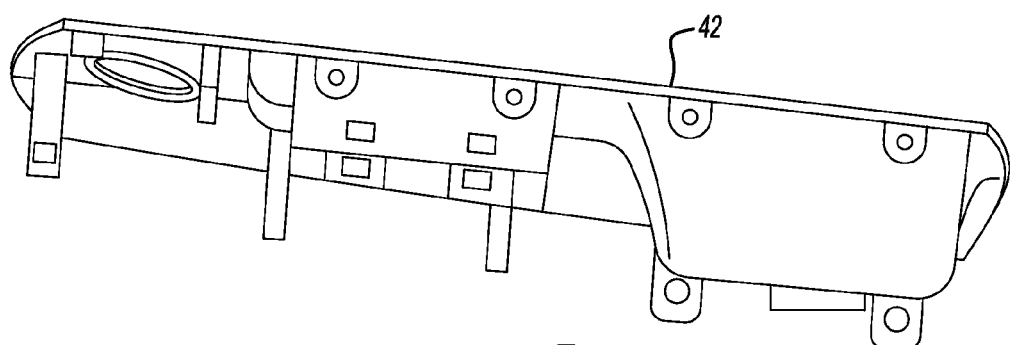
FIG. 5 is a schematic side illustration of another portion of the armrest assembly of FIG. 4.
Figure 6:
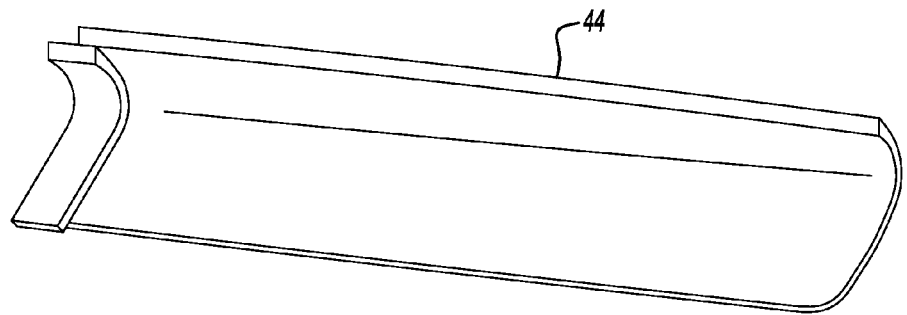
FIG. 6 is a schematic perspective illustration of yet another portion of the armrest assembly of FIGS. 4 and 5.

Referring to FIG. 3, a door handle support 28 may also be injection molded and added to the natural fiber substrate of door trim panel 22. The door handle support 28 mounts to an opening 30 formed in the door trim panel 22 of FIG. 2. Referring to FIG. 4, an armrest trim component 32 is formed from a compression-molded, low mass natural fiber substrate. A "cut-and-sew" surface layer may be applied to the natural fiber substrate. The armrest component 32 is secured to the door trim panel 22 with fastener openings 34 aligned with fastener openings 36 and opening 38 aligned with opening 40 to allow a door handle (not shown) to extend therethrough. Referring to FIGS. 5 and 6, an injection-molded armrest component 42 formed from an acrylonitrile-butadiene-styrene copolymer-based (ABS) plastic is configured to be secured at an opening 43 formed in the door trim panel 22. Referring to FIG. 6, a cut-and-sew skin layer 44 may then be applied over the armrest component 42 before it is secured to the door trim panel 22.

The upper and lower retainer 14A and 14B are configured to be injection molded. The retainers 14A, 14B do not form part of the show surface of the door. Thus, more expensive tooling, such as die inserts typically used to form an undercut for attachment features, are not required to form the retainers 14A, 14B.

Figure 7:
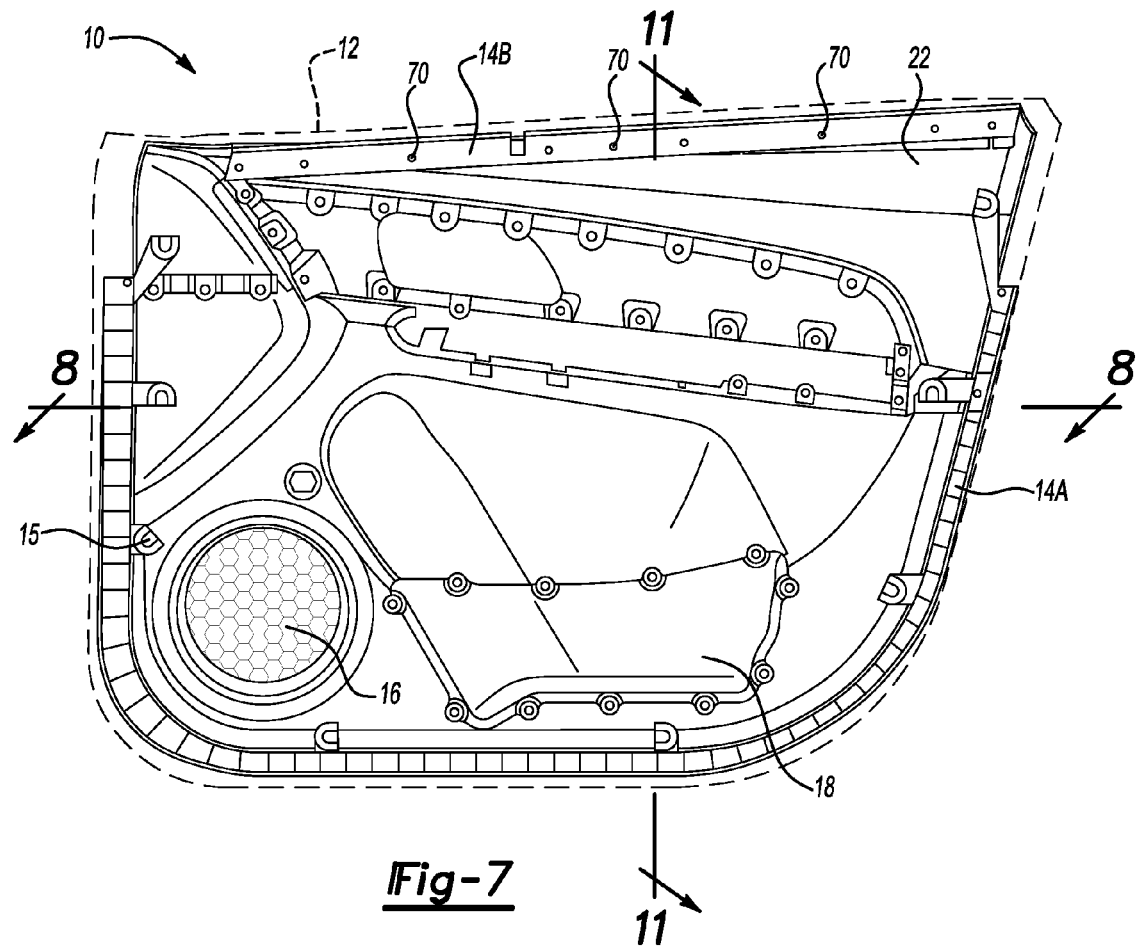
FIG. 7 is a schematic side illustration of the door assembly of FIG. 1 including the retainer and additional structural components assembled to the door trim panel of FIG. 2.

Referring to FIG. 7, the door trim assembly 10 is shown from a vantage point outboard of the door assembly 10, i.e., with any door body panels, such as door inner panel 12, overlaying the structure shown. As further described below, the door trim panel 22 is secured to the retainers 14A, 14B, and the lower retainer 14A is secured to the door inner panel 12 (best shown in FIGS. 8 and 9). In FIG. 7, the door inner panel 12 is shown only in phantom as it would be attached to the retainer 14A forward of the view shown (i.e., overlaying the retainer 14A and door trim panel 22). The upper retainer 14B is secured to a window frame, not shown. The speaker cover 16 and trim support 18 are also secured to the door trim panel 22.

Referring to FIG. 8, the lower retainer 14A is shown secured to the door inner panel 12 (shown in fragmentary view). A fastener 47, shown only in phantom in FIG. 9, is housed in a cage 48 formed in each of the fastener support portions 15 of the retainer 14A. The fastener 47 may be of a bird beak-type or other type with flexible legs that may be inserted through an aligned opening 49 in the inner door panel 12.

As best shown in FIGS. 9 and 10, the lower retainer 14A is formed with a recessed channel 50 in which a periphery 52 of the door trim panel 22 is retained when the door trim panel 22 is secured to the lower retainer 14A. The retainer 14A is also formed with a rib 54 adjacent the channel 50 that supports the door trim panel 22. The door trim panel 22 is secured to the retainer 14A at a contact interface 51 by bonding, whether adhesive bonding or otherwise, or vibration or heat welding.

Referring to FIG. 10, the retainer 14A has a substantially flat surface 56 adjacent the channel 50 that is configured to contact an elastomeric seal 58 secured to an automotive B-pillar 60 when the door assembly 10 is placed in a closed position, as is understood by those skilled in the art. The surface 56 is provided so that the seal 58 may contact the retainer 14A rather than the door trim panel 22, as it is difficult to provide a sealing surface on a component made of natural fiber materials, such as the door trim panel 22.

Figure 11:
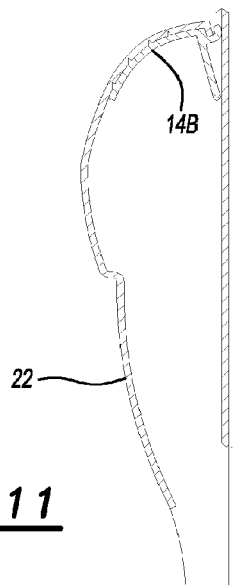
FIG. 11 is a schematic cross-sectional view of the door assembly of FIG. 7 taken at the lines 11-11.
Figure 12:
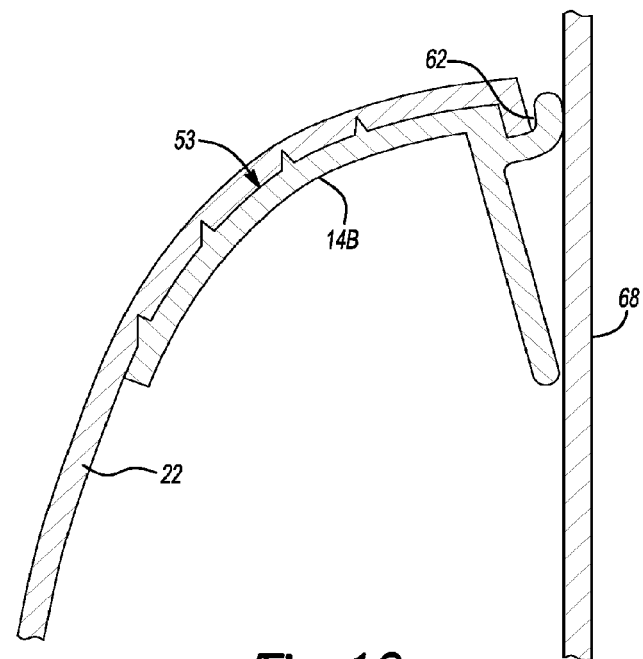
FIG. 12 is an enlarged schematic cross-sectional view of an end portion of FIG. 11.
Figure 13:
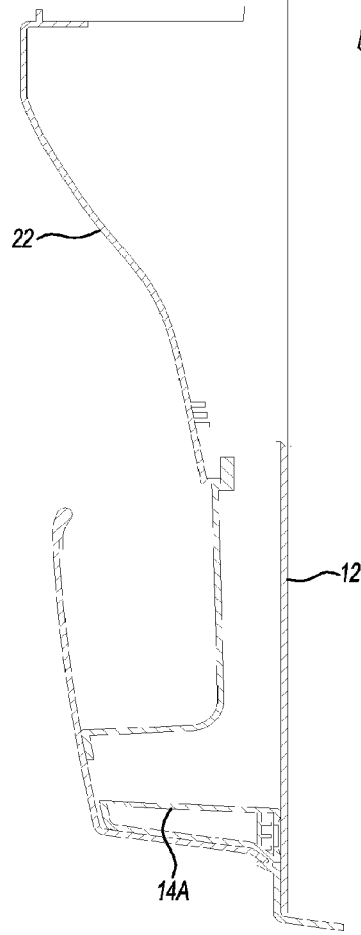
FIG. 13 is an enlarged schematic cross-sectional view of an opposing end portion of FIG. 11.

Referring to FIGS. 11 and 12, the upper retainer 14B has a channel 62 in which the door trim panel 22 is supported. The door trim panel 22 is secured to the retainer 14A at a contact interface 53 by bonding, whether adhesive bonding or otherwise, or vibration or heat welding. The upper retainer 14B is secured to a window frame 68 at several different locations by extending fasteners through openings 70 (selected ones of which are numbered in FIG. 7) formed in the upper retainer 14B into aligned openings (not shown) in the window frame 68.

Figure 14:
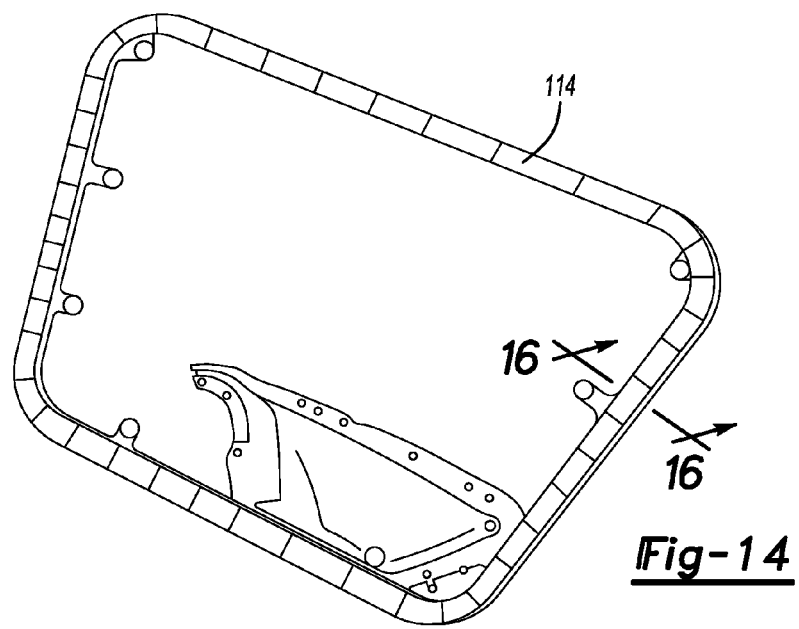
FIG. 14 is a schematic perspective illustration of a one-piece retainer.

Referring to FIG. 14, an alternative embodiment of a one-piece retainer 114, which may be referred to as a retainer ring, is illustrated. The retainer 114 is a filled polypropylene material, such as a glass or talc-filled polypropylene or a thermoplastic olefin polypropylene-based compound. Such materials exhibit sufficient strength to be secured to a sheet metal component, such as door inner panel 112 of FIG. 16, and provide support to trim components, as described below. Additionally, such materials lend themselves to injection molding.

Figure 15A:
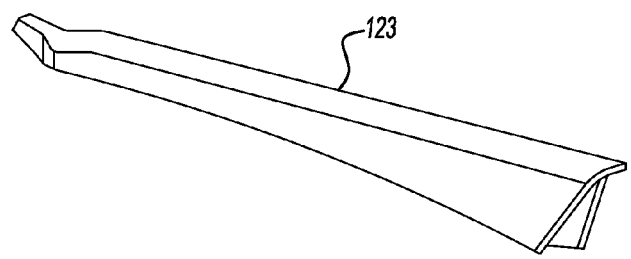
FIG. 15A is a schematic perspective illustration of a multi-piece door trim panel assembly for use with the one-piece retainer of FIG. 14.
Figure 15A:
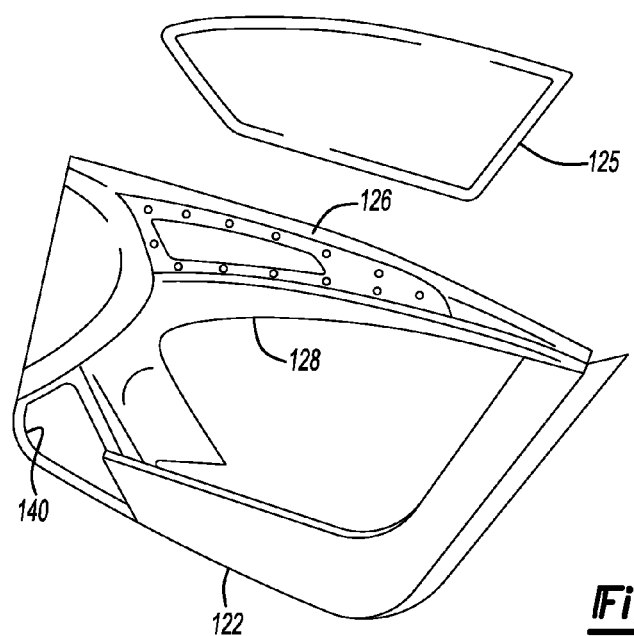

Referring to FIG. 15A multiple door trim components including a lower door trim panel 122, and upper trim panel 123 and an insert panel 125 are illustrated. The upper trim panel 123 is bonded, welded, and/or heat staked to the lower door trim panel 122 along an upper portion 126 thereof. The insert panel 125 is bonded or heat staked to a mid-portion 128 of the lower door trim panel 122. The lower door trim panel 122, upper trim panel 123 and insert panel 125 may be multi-layer compression molded components, with substrate layers of ABS, polypropylene, TPO, a filled polypropylene, a lofted glass or a lofted natural fiber material. A cut-and-sew layer or a skin layer may be applied over the substrate layers for an aesthetically-pleasing viewing surface. Referring to FIG. 15B, additional door trim components including a first component 130 of a lofted polyethylene fiber and a second component 132 of a compression-molded sheet polypropylene are configured to be secured to the door trim panel 122 as well. A trim plate 134 and a speaker grille 136 mount to the opening 140 in the door trim panel 122. Referring to FIG. 15C, various trim plates are provided for application to the assembled trim components of FIGS. 15A and 15B, including a nylon trim plate 142, a trim plate 144 that may be ABS with a film or paint layer, or alternatively may be wood or metal, depending on the vehicle model. Finally, a third trim plate 146 is shown that may be ABS with a film or paint layer.

Referring to FIG. 15D, a multi-piece armrest assembly includes a base 148 of glass-filled polypropylene, and additional glass-filled polypropylene components 150, 151. A polyurethane foam layer 154 is applied above the base 148, and a skin 156 of polyurethane or leather is then applied over the layered components 148, 151, 152, 154. An armrest trim component 158 of ABS with a paint or film layer is then applied to the skin 156 or the foam layer 154.

Figure 16:
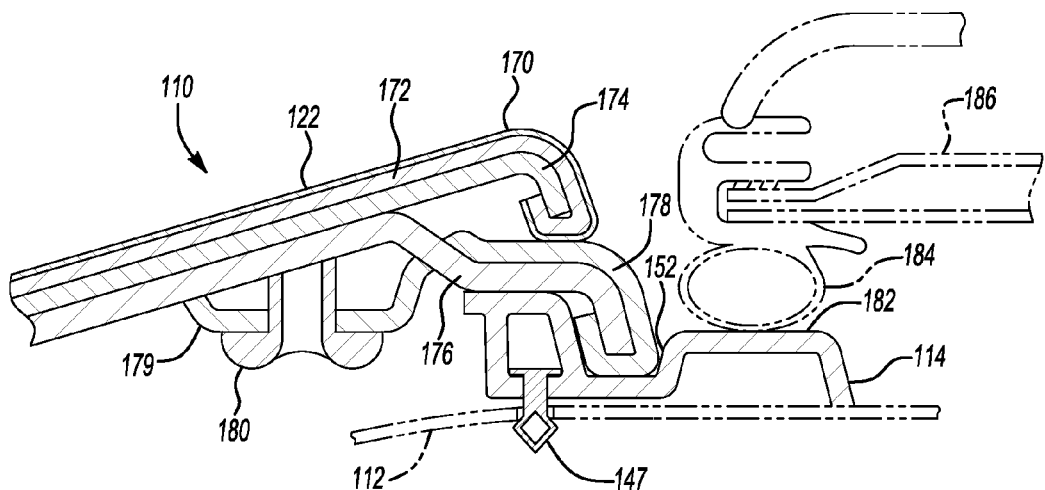
FIG. 16 is a schematic cross-sectional view of a door assembly including the door trim panel assembly of FIG. 14, taken at the lines 16-16 of FIG. 14, secured to the one-piece retainer of FIG. 14, with the one-piece retainer secured to a door inner panel.

The door trim panel 122 is secured to the retainer 114 by inserting a peripheral edge into a recess, as described with respect to FIG. 16. The retainer 114 is secured to a door inner panel 112, as shown in FIG. 16. The integrity of the connection between the retainer 114 and the door trim panel 122 need only be validated once, and identical retainers 114 can then be used with various trim components across multiple vehicle model types that utilize the same door trim panel 122.

Referring to FIG. 16, a cross-sectional view taken at the lines 16-16 of FIG. 14 shows the door trim panel 122 assembled to the retainer 114, which in turn is assembled to a door inner panel 112, to form in part a door assembly 110. The door trim panel 122 includes a skin layer 170, a foam layer 172 and a natural fiber substrate layer 174. The skin layer 170 is bonded to the foam layer 172, which in turn is bonded to the natural fiber substrate layer 174. Natural fiber substrate insert layers 176, 178 are bonded to one another and to the substrate layer 174. The insert layers 176, 178 are supported in a recess or channel 152 of the retainer 114. The heat stake 180 is heated and melts to the adjacent components (portion 179 and layer 176). A fastener 147 supported by the retainer 114 is secured through an opening in the door inner panel 112 after the door trim panel 122 is secured to the retainer 114. The insert layers 176, 178 allow the layers 172, 174 with skin 170 to appear above the retainer 114, for styling purposes. Alternatively, the inserts 176, 178 could be eliminated, with the layers 170, 172, 174 placed in the recess 152. In that case, a portion of layer 174 may extend downward to support heat stakes. Instead, a portion 179 of substrate layer 176 dips down to support a heat stake 180 inserted therethrough. The panels 122 may be bonded or screwed, adhered or heat-welded to the retainer 114.

The retainer 114 has a substantially flat surface 182 adjacent the recess 152 that is configured to contact an elastomeric seal 184 secured to an automotive B-pillar 186 when the door assembly 110 is placed in a closed position, as is understood by those skilled in the art.

Figure 17:
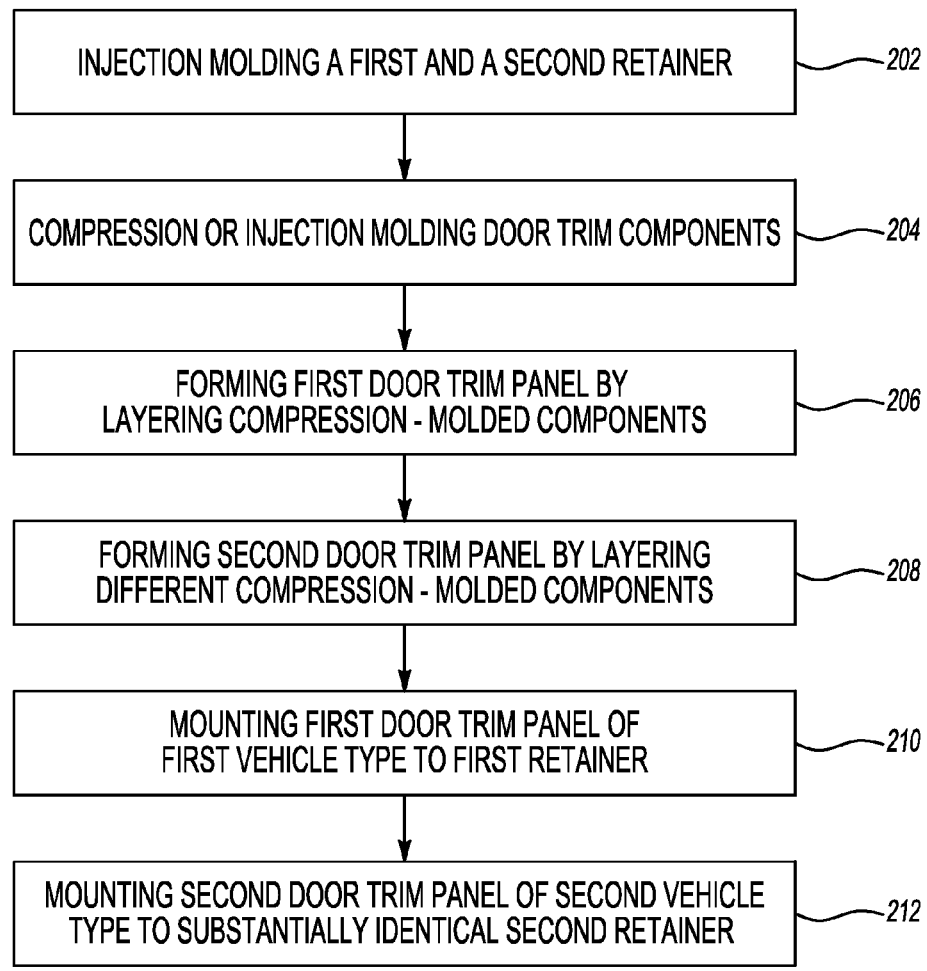
FIG. 17 is a flow diagram illustrating a method of assembling vehicle doors.

Referring to FIG. 17, a flow chart illustrates a method 200 of assembling vehicle doors. The method 200 begins with step 202, injection molding substantially identical retainers, such as an inventory of retainers identical to retainer 114 of FIG. 14 that is configured to surround the outer periphery of a first door trim panel such as door trim panel 122 of FIG. 15A. The method further includes step 204, compression molding door trim components, such as the foam layer 172, natural fiber substrate layer 174 and insert layers 176, 178 of door trim panel 122, and similar layers of upper trim panel 123 and insert panel 125 of FIG. 15A. Next, in step 206, the first door trim panel 122 is formed by layering the natural fiber substrate layer 174, the foam layer 172 and the outer skin layer 170. Next, in step 208, a second door trim panel is formed with different compression molded door trim components with the same or different natural fiber substrate layers and outer skin layers for a door of a second vehicle type. For example, the second door trim panel may be the alternative to door trim panel 122 discussed above, in which insert layers 176, 178 are eliminated and layers 179, 172, 174 are placed in recess 152. In step 210, the first door trim panel 122 is then mounted to a first of the retainers 114 by inserting a periphery of the door trim panel 122 into a first channel 152 formed by the retainer 114. In step 212, the second door trim panel is mounted to a substantially identical retainer 114 by inserting a periphery of the second door trim panel into a channel 152 of the retainer 114. Thus, identical retainers are used in assembling doors of different vehicle types having different door trim components.

Either or both of the mounting steps 210 and 212 may be by compression molding the various components of the door trim panel to the retainer. For example, natural fiber substrate layer or layers 174, 176, 178, and a negative or positive vacuum formed outer skin layer 170 can be compression molded to the filled polypropylene injection molded retainer 114 in a single compression molding step. The elevated temperature of the natural fiber substrate layer 174 will melt the polypropylene in adjacent foam layer 172 and/or skin layer 170 as well as the substrate of the retainer 114 so that the various components of the door trim assembly 110 are secured to one another in the compression molding step.

While the best modes for carrying out the invention have been described in detail, those familiar with the art to which this invention relates will recognize various alternative designs and embodiments for practicing the invention within the scope of the appended claims.

The invention claimed is:

1. A vehicle door trim assembly for connection with a door body panel, comprising:
   an elongated retainer configured for connection with the door body panel; and
   at least one door trim component; wherein the elongated retainer is configured to at least partially surround an outer periphery of the at least one door trim component; wherein the door trim component is connected to the retainer and thereby secured to the door body panel when the retainer is connected to the door body panel and the door trim component is secured to the door body panel only via the retainer.

2. The vehicle door trim assembly of claim 1, wherein the retainer is one of a filled polypropylene and a thermoplastic olefin polypropylene-based compound.

3. The vehicle door trim assembly of claim 1, wherein the at least one door trim component has an outermost surface formed by injection molding or negative or positive vacuum forming.

4. The vehicle door trim assembly of claim 1, wherein the at least one door trim component includes a natural fiber substrate layer.

5. The vehicle door trim assembly of claim 4, wherein the at least one door trim component further includes a foam layer on the natural fiber substrate layer.

6. The vehicle door trim assembly of claim 5, wherein the at least one door trim component includes one of a cut-and-sew layer and an outer skin layer on the foam layer.

7. The vehicle door trim assembly of claim 1, wherein the retainer is formed with a recessed channel extending at least partway along the retainer; and wherein at least a portion of the periphery of the at least one door trim component is configured to be retained within the recessed channel when the at least one door trim panel is connected to the retainer.

8. The vehicle door trim assembly of claim 7 in combination with a vehicle pillar having an elastomeric seal secured thereto; wherein the retainer has a substantially flat surface extending adjacent the channel and configured to interface with the seal to prevent leakage past the seal.

9. The vehicle door trim assembly of claim 7, wherein the retainer has a rib adjacent the recessed channel configured to support the at least one door trim component.

10. A vehicle door trim assembly for connection with a door body panel, comprising:
   an elongated retainer configured for connection with the door body panel;
   at least one door trim component connected to the retainer and thereby secured to the door body panel when the retainer is connected to the door body panel and the door trim component is secured to the door body panel only via the retainer;
   wherein the retainer is formed with a recessed channel extending at least partway along the retainer; wherein at least a portion of a periphery of the at least one door trim component is configured to be retained within the recessed channel when the at least one door trim panel is connected to the retainer; and
   wherein the retainer has a portion spaced from the recessed channel and configured to retain fasteners that fasten the at least one door trim component to the door body panel.

11. A method of assembling vehicle doors, comprising:
   mounting a first door trim component of a first door of a first vehicle type to a first retainer configured to surround at least a portion of an outer periphery of the first door trim component by inserting the periphery into a first channel formed by the first retainer; and
   mounting a second door trim component of a second door of a second vehicle type to a second retainer configured to surround at least a portion of an outer periphery of the second door trim component by inserting the periphery of the second door trim component into a second channel formed by the second retainer;
   wherein the first and second retainers are substantially identical; and wherein the first and the second door trim components are of different materials.

12. The method of claim 11, further comprising:
   injection molding the retainer.

13. The method of claim 11, further comprising:
   compression or injection molding at least a portion of the door trim components.

14. The method of claim 11, wherein at least one of the door trim components includes a natural fiber substrate layer and a vacuum formed outer skin layer; and wherein the mounting is by compression molding the substrate layer and outer skin layer to the respective retainer with heat of the adjacent layers thereby bonding the layers together and securing the layers of the at least one door trim component to the respective retainer.

15. The method of claim 11, further comprising:
   layering a respective natural fiber substrate layer with a respective foam layer and a respective outer skin layer to form the respective door trim components.

16. The method of claim 15, wherein the outer skin layer is formed by negative or positive vacuum forming.

* * * * *